(12) United States Patent
Li et al.

(10) Patent No.: US 12,005,733 B2
(45) Date of Patent: Jun. 11, 2024

(54) SOUND ABSORBER UNIT AND WHEEL WITH SOUND ABSORBER DEVICE

(71) Applicant: CITIC Dicastal Co., Ltd, Qinhuangdao (CN)

(72) Inventors: Xi Li, Qinhuangdao (CN); Zuo Xu, Qinhuangdao (CN); Zhihua Zhu, Qinhuangdao (CN); Shiwen Xu, Qinhuangdao (CN); Shide Li, Qinhuangdao (CN); Shaobing Huang, Qinhuangdao (CN); Mingbo Chen, Qinhuangdao (CN); Minglei Li, Qinhuangdao (CN)

(73) Assignee: CITIC Dicastal Co., Ltd, Qinhuangdao (CN)

( * ) Notice: Subject to any disclaimer, the term of this patent is extended or adjusted under 35 U.S.C. 154(b) by 668 days.

(21) Appl. No.: 17/170,861

(22) Filed: Feb. 8, 2021

(65) Prior Publication Data

US 2022/0144014 A1  May 12, 2022

(30) Foreign Application Priority Data

Nov. 11, 2020 (CN) .......................... 202011251289.6

(51) Int. Cl.
*B60B 21/12* (2006.01)
*G10K 11/172* (2006.01)

(52) U.S. Cl.
CPC ............ *B60B 21/12* (2013.01); *G10K 11/172* (2013.01); *B60B 2900/133* (2013.01); *G10K 2210/32272* (2013.01)

(58) Field of Classification Search
CPC ................. B60B 21/12; G10K 11/172; G10K 2210/12821; G10K 2210/32272; B60C 15/028

See application file for complete search history.

(56) References Cited

U.S. PATENT DOCUMENTS

| 4,374,535 A | * | 2/1983 | Watts ...................... B60B 21/12 |
| | | | 152/381.6 |
| 11,130,366 B2 | * | 9/2021 | Seung ..................... B60B 21/12 |

(Continued)

FOREIGN PATENT DOCUMENTS

| CN | 110808022 A | 2/2020 |
| CN | 111169221 A | 5/2020 |
| JP | 2015067051 A | 4/2015 |

OTHER PUBLICATIONS

European Search Report for the corresponding EP application No. EP21156443, dated Jun. 21, 2021, 7 pages total.

*Primary Examiner* — Jason R Bellinger
(74) *Attorney, Agent, or Firm* — Yong Chen

(57) ABSTRACT

A sound absorber unit and a vehicle wheel having a sound absorber device are provided. The sound absorber devices includes at least one sound absorber unit or at least one sound absorber assembly which is composed of a plurality of sound absorber units. The sound absorber unit is constructed into a box body in a hexahedron shape and forms a three-layer Helmholtz resonance sound absorption structure with double holes and single holes combined, and meanwhile, the sound absorber unit or the sound absorber assembly forms a structural resonance sound absorber. The double-absorption wheel air chamber sound resonance function organically combining Helmholtz resonance sound absorption and structural resonance sound absorption can be realized.

14 Claims, 2 Drawing Sheets

(56) References Cited

U.S. PATENT DOCUMENTS

| | | | |
|---|---|---|---|
| 11,472,228 B2* | 10/2022 | Shin | B60B 21/12 |
| 11,642,919 B2* | 5/2023 | Yoon | B60B 21/12 |
| | | | 301/95.101 |
| 2020/0276862 A1* | 9/2020 | Kamiyama | B60B 21/12 |

* cited by examiner

SOUND ABSORBER UNIT AND WHEEL WITH SOUND ABSORBER DEVICE

CROSS-REFERENCE TO RELATED APPLICATIONS

The present application claims the priority of Chinese patent application No. 202011251289.6, filed on Nov. 11, 2020, which is hereby incorporated by reference in its entirety.

TECHNICAL FIELD

The disclosure relates to a sound absorber unit and a wheel with sound absorber device, in particular to vehicle wheel with pneumatic tire.

BACKGROUND

In the normal driving process of the vehicle, the excitation of the road surface to the wheels and the excitation of the wheel axle to the wheels caused by the rotation imbalance of the wheels can excite an air chamber in the wheels to generate acoustic resonance, and the resonance is transmitted to a vehicle body structure by means of the wheel axle and a suspension system and then radiates noise in the vehicle. The noise characteristics are mainly low-frequency narrow bands with high magnitude, and noise interference is formed for the interior passenger environment of the vehicle, and effective control is needed.

Currently, there are numerous studies and patents that provide methods to effectively control such acoustic resonances. The method mainly adopts a sound absorption control principle, wherein the Helmholtz resonance sound absorption is widely applied and has a good effect. For example, Chinese patents CN101301842B, CN104981359B, CN105209267B, and CN104908513B relate to a series of wheel technical solutions on the base of Helmholtz resonator noise reduction method. However, in the solutions known from the prior art, the structural design and mounting structure of the Helmholtz resonator are complicated and also not ideal in its sound absorption effect. In practice, even if the wheels are of the same type, the occurrence frequency of the acoustic resonance is different due to different driving states and different product positioning, and in addition, high-magnitude noise with multiple narrow bands often occurs. In particular, since the states of the four wheels during driving are different, a plurality of narrow-band high magnitude noises with different distribution characteristics exist, so that higher magnitude noise presents in a wider frequency band, which is contradictory to the advantages of the Helmholtz narrow-band sound absorption. Therefore, the structure on the base of the Helmholtz sound absorption principle still needs to be continuously developed and improved. Meanwhile, the structure on the base of the principle is various, and further improvement in amplitude control and bandwidth control is provided. In addition, the Helmholtz sound absorption principle is also suitable to be combined with other noise reduction principles (such as box-like structure resonance sound absorption) to make up for the defects of the Helmholtz principle, so that the efficiency of controlling the resonance of the air chamber can be more effectively improved, but the combination of various noise reduction principles cannot be popularized and applied in the aspect of reducing the resonance of the wheel air chamber at present.

Further, in the solutions known from the above-mentioned prior art, the structural design and mounting structure of the Helmholtz resonator are complicated, and for this reason, the resonator component ("sub air chamber component") is configured with a flange-like thin plate ("rim"), a groove ("groove") is formed in a wall surface specially configured on the wheel rim, and the positioning and fixing of the resonator component are realized by the engagement of the flange-like thin plate with the groove of the wall surface, and this engagement mechanism is difficult to ensure the connection strength due to its thin-walled feature, and on the other hand, since the realization of the connection fitting of both parts basically depends on the structural dimensional accuracy, it is highly required for the processing and manufacturing of the component, and the alignment and mounting work of both parts are troublesome, and the final mounting and fastening force cannot be controlled.

SUMMARY

The disclosure aims to provide a sound absorber unit specially constructed on the base of the Helmholtz resonator principle, and a sound absorbing device formed by the sound absorber unit is applied to noise reduction of wheels so as to partially or completely overcome the defects in the prior art, and particularly, a more effective noise reduction effect is realized by adopting a combining mode of porous three-layer Helmholtz structure sound absorption and box-like structural resonance sound absorption.

In order to improve the wheel air chamber resonance control effect, the disclosure is mainly on the base of the following thought: firstly, a porous three-layer resonance sound absorbing structure is adopted, overcoming the defect in the control principle that the single Helmholtz resonance sound absorbing is difficult to realize effective control of low-frequency broadband noise under the limited volume; secondly, a box-like structure in a hexahedron shape is adopted, the box-shaped structure is preferably made of plastic materials, the structural resonance frequency is designed to be consistent with the resonance frequency of the air chamber, resonance sound absorption is realized under the combined action of three layers of double holes and a single hole, and higher noise reduction is realized in a wider frequency band; thirdly, the structure of three layers of hollow square tubes is allowed to be adopted, the structure is simple, and the processing is convenient.

Specifically, the disclosure provides a sound absorber unit which is mounted on a moving part (such as a wheel rim of a wheel) in a gas environment to reduce acoustic resonance, and is wherein the sound absorber unit is constructed into a hexahedral box body and forms a three-layer Helmholtz resonance sound absorbing structure combining a double hole with a single hole, the box body is provided with two side surfaces which limit the boundaries of two ends of the box body in the moving direction of the moving part, one end of the box body is formed into an open end side surface, the box body is provided with an opening which is communicated into the inner cavity of the box body, and the other end of the box body is formed into a closed side surface; the interior of the box body is divided into a first hollow cavity, a second hollow cavity and a third hollow cavity which are arranged in succession along the movement direction of the moving part via the first partition plate and the second partition plate; wherein two first hollow pipe orifices are formed in the open end surface, the first hollow pipe orifices opening to the gas environment space, the first hollow pipe orifices extending into the first hollow cavity by a distance corresponding to the pipe length thereof; a second hollow pipe orifice is formed in the first partition plate, and is opened to the first hollow cavity, and the second hollow pipe orifice extends into the first hollow cavity by a distance corresponding to the pipe length; two third hollow pipe orifices are formed in the second partition plate, the pipe orifices of the third hollow pipe orifices are opened to the second hollow cavity, and the third hollow pipe orifices extend into the third hollow cavity by a distance corresponding to the pipe length of the third hollow pipe orifices; the first hollow cavity, the second hollow cavity and the third hollow cavity form three resonant cavities with layered functions of the three-layer Helmholtz resonance sound absorbing structure.

It should be noted that the "hexahedron-like" in the present application is not strictly limited to a regular hexahedron (e.g., rectangular parallelepiped) shape in a geometrical sense, but may generally have a shape similar to a hexahedron, wherein one or more surfaces are configured to have a certain curvature (e.g., the bottom surface and/or the top surface of the box body have a circular arc shape adapted to the contour of the outer surface of the rim, i.e., to have a "curved hexahedron shape") and/or have a local convex or concave structure (e.g., for mounting or fixing purposes), may not be absolutely orthogonal between intersecting surfaces, and may not be absolutely parallel between opposite surfaces, which does not affect the implementation of the technical solution of the present disclosure.

The disclosure improves the wheel air chamber resonance control effect and ensures that the molding processing of the sound absorption device can be realized by means of an applicable production technology aiming at the structural design of the sound absorbing device. According to one embodiment, the sound absorber unit is an arc hexahedron box body integrally made of metal material or plastic material. According to another implementation form, the sound absorber unit is an arc hexahedron box body which is made by assembling and welding metal plates or plastic plates.

The first, second and third hollow pipe can be square pipe or round pipe. In particular, the sound absorber unit with the three-layer hollow square tube structure can be conveniently processed and manufactured by using the conventional production technology.

According to one embodiment, the structural parameters of the sound absorber unit box body are determined by the predetermined sound absorption coefficient and the sound absorption quantity of the three-layer Helmholtz resonance sound absorbing structure, and include the plate body thickness of the first partition plate, the second partition plate, the open end side and the closed end side, the orifice diameter and the pipe length of the first, second and third hollow pipes, and the shape, volume and wall thickness of the first hollow cavity, the second hollow cavity and the third hollow cavity.

Accordingly, the present disclosure provides a vehicle wheel equipped with sound absorbing device mounted inside the wheel air chamber for reducing acoustic resonances, the sound absorbing device comprising at least one sound absorber unit as described above or at least one sound absorber assembly integrated by a plurality of said sound absorber units.

According to one embodiment, the sound absorber unit or the sound absorber assembly can be bound to the wheel rim by means of a binding element. Particularly, the binding element with the tensioning effect is adopted to fix the sound absorber unit, so that the convenient and controllable mounted operation is allowed to be implemented, the wheel assembly (particularly the sound absorbing device module) is convenient to disassemble and assemble, and the later maintenance and replacement of spare parts are facilitated.

The sound absorber unit or the sound absorber assembly may be integrally made of a metal material or a plastic material. Advantageously, the box-like sound absorber unit or absorber assembly itself forms a structural resonance absorbing component of which first order natural modal frequency coincides with the first order natural modal frequency of the wheel air chamber as the structural resonance absorbing component.

According to one embodiment, the binding element is a strap (for example, a steel strap) which is pressed from the top side of the box body of the sound absorber unit or sound absorber assembly against the outer surface of the rim of the wheel (wheel rim) and fastens the sound absorber unit or sound absorber assembly around the wheel rim, the two ends of the strap being fixedly connected by means of a snap-fit, the tension of the strap being adjustable and/or displayable by means of a fastening tool.

To this end, it is advantageous if the sound absorber unit or the sound absorber assembly is provided with a U-shaped groove for embedding the strap on the top surface of its box body.

According to one embodiment, the sound absorber assembly is formed by two sound absorber units connected together directly by their closed end surface or connected together by means of a thin plate. By adopting the sound absorber assembly, the situation that the sound absorbing structure is mounted inversely in the way of facing the stream due to the wrong orientation is avoided during mounting, and in the actual use process, the wheels provided with the corresponding sound absorbing devices can be replaced at will without influencing the noise reduction effect.

According to one embodiment, a plurality of sound absorber units or sound absorber assemblies are arranged side by side on or along the wheel rim, in order to optimize or adapt the sound absorption and noise reduction requirements of the wheel as a whole or the dynamic balancing characteristics thereof. In particular, a plurality of sound absorber units or sound absorber assemblies may be arranged uniformly along the circumferential direction of the wheel rim, for example, two sound absorber units (or sound absorber assemblies) may be arranged symmetrically along the circumferential direction of the wheel rim, i.e., mounted opposite to each other in the wheel diameter direction, for a specific case of a specific vehicle type.

According to one embodiment, the sound absorber unit or the sound absorber assembly rests with the bottom side of the box body against the outer surface of the rim of the wheel in the mounting state. To this end, it is expedient if the sound absorber unit or the sound absorber assemblies is provided with at least one bend extending transversely to its box body, which divides the sound absorber unit or the sound absorber assembly in the longitudinal direction of its box body into at least two sections in order to adapt the box body base to the circular-arc-shaped contour of the outer surface of the rim in the mounting state. For the sound absorber unit, for example, the bending portion may be provided between the first and second chambers and between the second and third chambers; for example, the bending portion can be additionally provided at the connection point of the sound absorber unit for the sound absorber assembly. The bending portion can be designed as a material weak part of the box body, can be continuous or discontinuous along the transverse direction of the box body, can transversely extend by the box body, and can also only extend on a part of the transverse section of the box body.

The disclosure has the advantages that a comprehensive sound absorbing structure is formed by three-layer resonance sound absorption and structural resonance sound absorption which are combined by double holes and single holes, and more effective sound absorption effect can be realized, which is embodied in that: firstly, the sound absorption frequency is closer to the low frequency; secondly, the sound absorption frequency band is wider; thirdly, the sound absorption capacity is higher.

BRIEF DESCRIPTION OF THE DRAWINGS

Some exemplary embodiments of the disclosure are shown in the drawings. The embodiments and figures disclosed herein are to be regarded as illustrative rather than restrictive. It is also noted that for purposes of clarity of illustration, certain features are not necessarily drawn to scale in the drawings.

Figure 1:
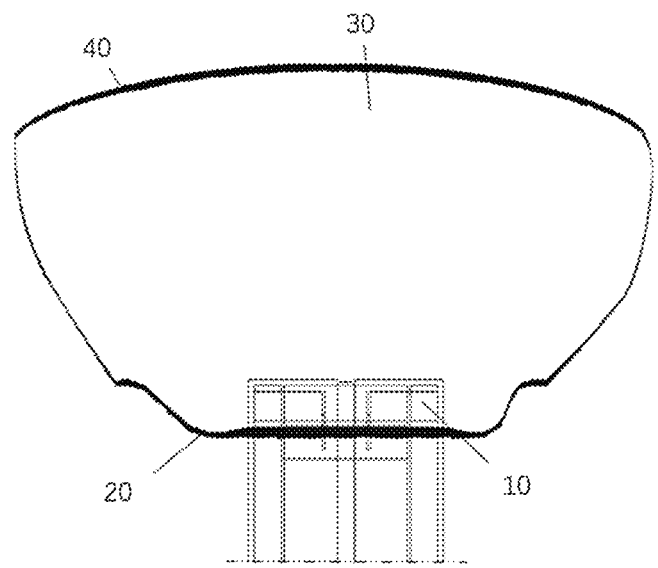
FIG. 1 is a schematic view of a mount of a sound absorber unit on a wheel.

Wherein: D—open end side surface, D'—closed end side surface of box body, B—thin plate, 1/1'—first hollow pipe, 2—first hollow cavity, 3—first partition plate, 4—second hollow pipe, 5—second hollow cavity, 6—second partition plate, 7/7'—third hollow pipe, 8—third hollow cavity, 9—U-shaped groove; 10—sound absorber unit, 20—wheel rim, 30—wheel air chamber, 40—tire, 50—binding element.

DETAILED DESCRIPTION

The technical solutions in the embodiments of the present application will be clearly and completely described below with reference to the drawings in the embodiments of the present application, and it is obvious that the described embodiments are some, but not all, of the embodiments of the present application. All other embodiments obtained by a person skilled in the art on the base of the embodiments in the present application without making any creative effort belong to the protection scope of the present application.

The terms "first", "second", "third" and the like in the description and claims of this application and in the accompanying drawings are used for distinguishing between different elements and not for describing a particular sequential order. Furthermore, the terms "include" and "have," as well as any variations thereof, are intended to cover non-exclusive inclusions. For example, a process, method, article, or apparatus that comprises a list of steps or elements is not limited to only those steps or elements but may alternatively include other steps or elements not expressly listed or inherent to such process, method, article, or apparatus. It will be understood by a person skilled in the art that throughout the present specification and claims, the terms "longitudinal", "lateral", "upper", "lower", "front", "rear", "left", "right", "vertical", "horizontal", "top", "bottom", "inner", "outer", and the like, are used in a sense of orientation or positional relationship indicated in the drawings, which is for convenience only to describe the disclosure and to simplify the description, and are not intended to indicate or imply that the device, mechanism, structure, or element so referred to must have a particular orientation, be constructed in a particular orientation, and be operated, and thus the terms are not to be construed as limiting the disclosure.

Reference herein to "an embodiment" means that a particular feature, structure, or characteristic described in connection with the embodiment can be included in at least one embodiment of the application. The appearances of the phrase in various places in the specification are not necessarily all referring to the same embodiment, nor are separate or alternative embodiments mutually exclusive of other embodiments. It is explicitly and implicitly understood by a person skilled in the art that the embodiments described herein may be combined with other embodiments.

FIG. 1 is a schematic view of a mount of a sound absorbent unit on a wheel.

Figure 2:
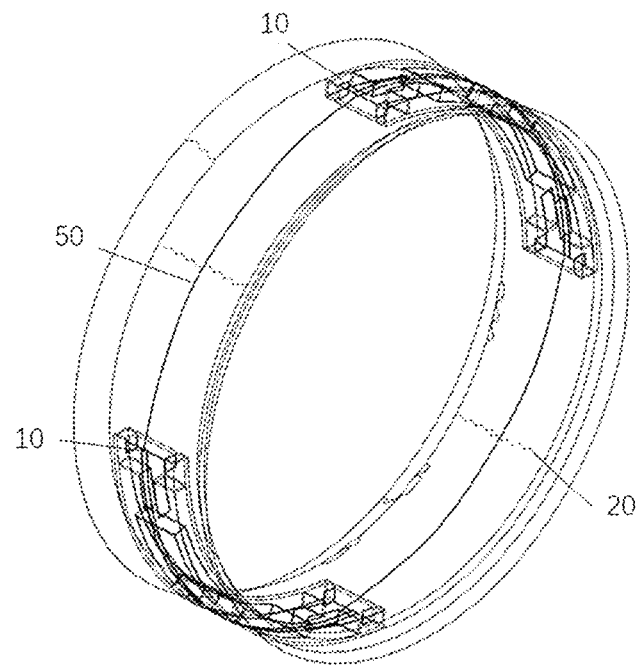
FIG. 2 is a schematic diagram of a sound absorber unit disposed on a wheel rim according to a preferred embodiment.

The present application provides a sound absorber unit 10 mounted on a moving part (particularly wheel rim 20 of a pneumatic tire 40 equipped automotive wheel as shown in FIG. 1) in a gas environment (particularly the wheel air chamber 30 shown in FIG. 1) to reduce sound resonance. As shown in FIG. 2 and particularly in FIG. 3, the sound absorber unit is constructed as a hexahedral-shaped box body and is formed as a three-layer Helmholtz resonance sound absorbing structure that combines double holes with single holes, and the box body has two side surfaces that define the boundaries of the two ends of the box body in the movement direction of the moving part, wherein an open end side surface D is formed at one end, and has an opening leading into a hollow cavity in the box body, and a closed end side surface D' is formed at the other end; the interior of the box body is divided by a first partition plate 3 and a second partition plate 6 into a first hollow cavity 2, a second hollow cavity 5 and a third hollow cavity 8, which are arranged in succession along the movement direction of the moving part; wherein, pipe orifices of two first hollow pipes 1, 1' are formed in the open end side surface D, the pipe orifices of the first hollow pipes are open toward the gas environment space, and the first hollow pipes extend into the first hollow cavity 2 by distances corresponding to the pipe lengths thereof; the pipe orifice of a second hollow pipe 4 is formed in the first partition plate 3, the pipe orifice of the second hollow pipe is open toward the first hollow cavity 2, and the second hollow pipe extends into the second hollow cavity 5 by a distance corresponding to the pipe length thereof; the pipe orifices of two third hollow pipes 7, 7' are formed in the second partition plate 6, the pipe orifices of the third hollow pipes are open toward the second hollow cavity 5, and the third hollow pipes extend into the third hollow cavity 8 by distances corresponding to the pipe lengths thereof; the first hollow cavity 2, the second hollow cavity 5 and the third hollow cavity 8 form three resonant cavities for layering of the three-layer Helmholtz resonance sound absorbing structure.

Possibly, the sound absorber unit 10 is an arc-shaped hexahedral box body integrally formed from metal material or plastic material; or the sound absorber unit 10 is an arc-shaped hexahedral box body formed by assembling and welding metal plates or plastic plates.

The first hollow pipes 1 and 1', the second hollow pipe 4 and the third hollow pipes 7 and 7' may be configured as square pipes or round pipes.

According to the disclosure, structural parameters of the box body of the sound absorber unit 10 are determined by a predetermined sound absorption coefficient and a sound absorption volume of the three-layer Helmholtz resonance sound absorbing structure; the structural parameters comprise plate thicknesses of the first partition plate 3, the second partition plate 6, the open end side surface D and the closed end side surface D', pipe orifice apertures and pipe lengths of the first hollow pipes 1, 1', the second hollow pipe 4 and the third hollow pipes 7, 7', and shapes, volumes and wall thicknesses of the first hollow cavity 2, the second hollow cavity 5 and the third hollow cavity 8.

Based on this, the present application also provides a wheel, equipped with a sound absorbing device mounted in a wheel air chamber 30 to reduce sound resonance, wherein the sound absorbing device comprises at least one sound absorber unit 10 as described above or comprises at least one sound absorber assembly combined by a plurality of sound absorber units 10 as a whole.

FIG. 2 is a schematic diagram of a sound absorbent unit disposed on a wheel rim according to a preferred embodiment.

The sound absorber unit or the sound absorber assembly may be bound on a wheel rim 20 of the wheel by means of a binding element 50 (see FIG. 2).

Advantageously, the sound absorber unit 10 or the sound absorber assembly itself forms a structural resonance sound absorbing component, and serving as the structural resonance sound absorbing component, the sound absorber unit 10 or the sound absorber assembly has a first-order natural mode frequency consistent with the first-order natural mode frequency of the wheel air chamber 30.

In this embodiment, the binding element 50 is a strap, (e.g. a steel strap) the strap presses the sound absorber unit 10 or the sound absorber assembly on the outer surface of the rim of the wheel (wheel rim) from the top surface of the box body of the sound absorber unit 10 or the sound absorber assembly and wraps around the wheel rim 20 to fasten the sound absorber unit 10 or the sound absorber assembly, the two end heads of the strap are fixedly connected by means of a buckle, and the tension of the strap can be adjusted and/or displayed with the aid of a fastening tool. Suitably, the sound absorber unit 10 or the sound absorber assembly is provided with a U-shaped groove 9 for the embedment of the strap on the top surface of the box body thereof (see FIG. 3).

The sound absorber assembly can be formed by directly connecting the two sound absorber units 10 by the closed end side surfaces D' thereof or by connecting and combining the two sound absorber units by a thin plate B. In the embodiment shown in FIG. 2, two sound absorber assemblies formed in this way are arranged symmetrically in the circumferential direction of the wheel rim, i.e. are mounted opposite each other in the diameter direction of the wheel.

According to actual needs, a plurality of sound absorber units 10 or sound absorber assemblies can be arranged side by side on the wheel rim 20 of the wheel, or a plurality of sound absorber units 10 or sound absorber assemblies are distributed along the circumferential direction of the wheel rim.

The sound absorber unit 10 or the sound absorber assembly abuts against the outer surface of the wheel rim 20 via the bottom surface of the box body in a mounting state. In this case, it is expedient if the sound absorber unit 10 or the sound absorber assembly is provided with at least one bending portion extending transversely along the box body thereof, and the bending portion divides the sound absorber unit or the sound absorber assembly into at least two sections in the longitudinal direction of the box body thereof, so that the bottom surface of the box body conforms to the arc-shaped contour of the outer surface of the rim in the mounting state.

Figure 3:
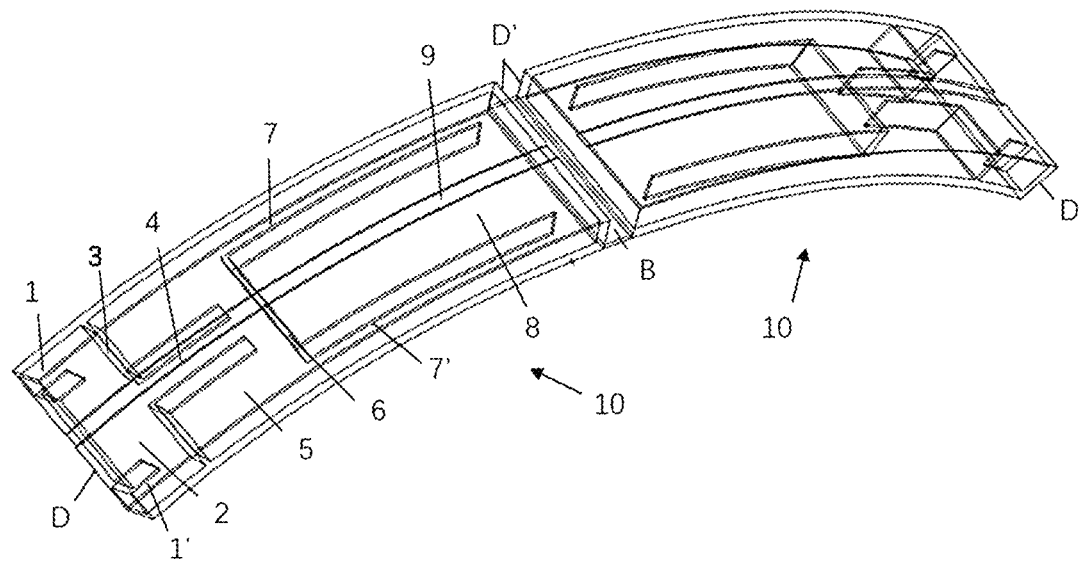
FIG. 3 is a schematic diagram of the construction principle of the sound absorber unit.

FIG. 3 shows a schematic diagram of the construction principle of the sound absorber unit.

Thus, according to this embodiment of the present disclosure, a three-layer sound absorbing structure mounted on wheel rim 20 for reducing the resonance of the wheel air chamber can be realized by a box-like structure (see FIGS. 2 and 3) having a circular parallelepiped hexahedron shape, which can be formed by an injection molding process, and which is divided into three hollow cavities (corresponding to 2, 5 and 8 indicated in the drawing) by two thin plates (corresponding to 3 and 6 indicated in the drawing), and which has two first hollow square tubes (corresponding to 1 and 1' indicated in the drawing) mounted (or formed) on one side surface (parallel to the first and second thin plates in the box), an second hollow square tubes (corresponding to 4 indicated in the drawing) mounted (or formed) on split thin plate between the first and second layers in the box, and two third hollow square tubes (corresponding to 7 and 7' indicated in FIG. 3) mounted (or formed) on split thin plate between the second and third layers in the box. The plane of the pipe orifice at one end of each of the two first hollow square pipes and the side surface of the box-like structure are arranged on the same plane, and the pipe length extends into the first hollow cavity 2; the plane of pipe orifice at one end of the second hollow square tubes and the split thin plate in the box are arranged on the same plane, and the tube length extends into second hollow cavity 5; the plane of pipe orifice at one end of the two third hollow square tubes 3 and the split thin plate in the box are arranged on the same plane, and the tube length extends into the third hollow cavity 8. The two first hollow square tubes are communicated with the tire air chamber, and the box-like structure is integrally mounted on the circumferential surface of the circular arc of the wheel rim to form a three-layer Helmholtz resonance sound absorbing structure combining double holes with single holes. This configuration is closer to low frequencies and wider in bandwidth than single cavity single hole Helmholtz resonance sound absorption. The relevant parameters of the structural configuration are determined by utilizing the sound absorption coefficient and the sound absorption quantity of the three-layer Helmholtz resonance sound absorbing structure.

The box-like structure-considering weight and cost—is preferably made of plastic material with certain rigidity and strength, clings to the circular arc surface of wheel rim, and is fixedly mounted by means of steel belts or other fasteners. In the sound absorption structure in the mounting mode, the first-order natural modal frequency of the sound absorption structure is consistent with the first-order natural modal frequency of the wheel air chamber, and a structural resonance sound absorption device is formed by the sound absorption structure.

The natural mode/natural frequency of the structure meets the design requirements by material selection, thickness and shape adjustment, and can be calculated by a finite element method, particularly by software such as NASTRAN and ACTRAN. The sound absorption quantity of the porous three-layer resonance sound absorbing structure can be increased by corresponding design, and the sound absorption bandwidth can also be increased.

The box-like sound absorbing structure (or sound absorbing device or sound absorber unit or sound absorber assembly) is designed with a U-shaped groove (corresponding to 9 indicated in the drawing) on its upper surface, which is embedded by a steel strap or other fastening strap (corresponding to 50 indicated in the drawing), which is pressed against the wheel rim around the wheel rim to fix the sound absorbing structure (see FIG. 2). According to actual needs and specific design conditions, it is also possible to arrange a plurality of box-like sound absorbing structures on the wheel rim, with steel straps or other fastening straps being provided around the wheel rim to secure several of the box-like sound absorbing structures on the wheel rim together. The joint of the steel strap or other fastening straps is fastened by a buckle, and the fastening force can be displayed by a fastening tool so as to judge the firmness of the mounting.

Figure 4:
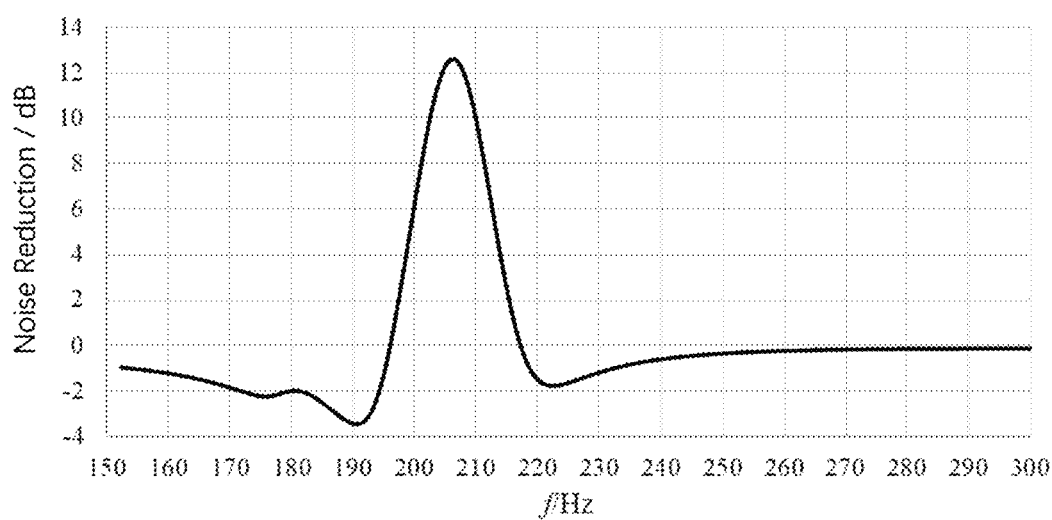
FIG. 4 is a graph showing the amount of noise reduction measured by modeling the acoustic behavior of a wheel/tire in one embodiment of an application.

FIG. 4 is a graph showing the amount of noise reduction measured by modeling the acoustic behavior of a wheel/tire in one embodiment of an application.

The geometrical dimension and sound absorption performance of the resonance sound absorbing structure of the sound absorber device (or sound absorber unit) shown in FIG. 3 are designed and adjusted according to the geometrical dimension of a wheel/tire of a certain vehicle in a driving state. The natural frequency of the tire air chamber is around 200 Hz. In this application embodiment, in order to make the structural mode of the resonance sound absorbing structure consistent with the natural mode of the tire air chamber, and achieve the purpose of structural resonance noise reduction, two sound absorber units 10 are connected in series at the closed end, and the two ends are connected by a thin plate B, so as to form a series three-layer resonant sound absorbing structure (i.e. a sound absorber assembly formed by combining the two sound absorber units into a whole, see FIG. 3 for example). In this embodiment, the sound absorber unit/absorber assembly is made of plastic material and is symmetrically mounted on the rim surface to form a pair of resonant sound absorbing structures, as shown in FIG. 2.

When a noise reduction amount measurement test is carried out, the resonance sound absorbing structure is mounted on a certain wheel according to the mode, and the noise reduction amount of the sound absorbing device is evaluated by using a modal frequency response method of the finite element ACTRAN software. Firstly, respectively calculating the modal of the wheel with or without a sound absorbing device; then setting a sound source at the position where the tire touches the ground on the base of the result of the modal; and finally, calculating the sound transmission of the sound source in the air chamber of the tire, keeping the wheel static, and positioning a measuring point at the top of the air chamber, so that a noise reduction effect graph of the resonance sound absorbing structure shown in the FIG. 4 can be obtained.

As can be seen from FIG. 4, the effective noise reduction frequency band is 195-215 Hz, the maximum noise reduction amount occurs at 205 Hz (which is close to the natural frequency of the tire air chamber), and the value exceeds 12 dB. It can be seen that the present disclosure can effectively reduce the noise generated by the resonance of the tire air chamber.

The above embodiments are described in detail, and specific embodiments are applied herein to explain the principles and embodiments of the present application, and the description of the embodiments is only used to help understand the core idea of the present application; meanwhile, for a person skilled in the art, according to the idea of the present application, the specific implementation and the application scope may be changed, and in summary, the content of the present specification should not be construed as a limitation to the present application.

What is claimed is:

1. A sound absorber unit, configured to be mounted on a moving part in a gas environment to reduce sound resonance, wherein the sound absorber unit is constructed as a hexahedral box body and is formed as a three-layer Helmholtz resonance sound absorbing structure that combines double holes with single holes, and the box body has two side surfaces that define the boundaries of two ends of the box body in the movement direction of the moving part, wherein an open end side surface is formed at one end and has an opening leading into a hollow cavity in the box body, and a closed end side surface is formed at the other end; the interior of the box body is divided by a first partition plate and a second partition plate into a first hollow cavity, a second hollow cavity and a third hollow cavity, which are arranged in succession along the movement direction of the moving part;

wherein pipe orifices of two first hollow pipes are formed in the open end side surface, the pipe orifices of the first hollow pipes are open toward the gas environment space, and the first hollow pipes extend into the first hollow cavity by distances corresponding to the pipe lengths thereof;

wherein a pipe orifice of a second hollow pipe is formed in the first partition plate, the pipe orifice of the second hollow pipe is open toward the first hollow cavity, and the second hollow pipe extends into the second hollow cavity by a distance corresponding to the pipe length thereof;

wherein pipe orifices of two third hollow pipes are formed in the second partition plate, the pipe orifices of the third hollow pipes are open toward the second hollow cavity, and the third hollow pipes extend into the third hollow cavity by distances corresponding to the pipe lengths thereof; and wherein the first hollow cavity, the second hollow cavity and the third hollow cavity form three resonant cavities for layering of the three-layer Helmholtz resonance sound absorbing structure.

2. The sound absorber unit according to claim 1, wherein the sound absorber unit is an arc-shaped hexahedral box body made from metal material or plastic material.

3. The sound absorber unit according to claim 1, wherein the sound absorber unit is an arc-shaped hexahedral box body formed by assembled and welded metal plates or plastic plates.

4. The sound absorber unit according to claim 1, wherein the first hollow pipes, the second hollow pipe and the third hollow pipes are square pipes or round pipes.

5. The sound absorber unit according to claim 1, wherein structural parameters of the box body of the sound absorber unit are determined by a predetermined sound absorption coefficient and a sound absorption volume of the three-layer Helmholtz resonance sound absorbing structure; the structural parameters comprise plate thicknesses of the first partition plate, the second partition plate, the open end side surface and the closed end side surface, pipe orifice apertures and pipe lengths of the first hollow pipes, the second hollow pipe and the third hollow pipes, and shapes, volumes and wall thicknesses of the first hollow cavity, the second hollow cavity and the third hollow cavity.

6. A wheel, equipped with a sound absorbing device mounted in a wheel air chamber to reduce sound resonance, wherein the sound absorbing device comprises at least one sound absorber unit according to claim 1 or comprises at least one sound absorber assembly combined by a plurality of sound absorber units according to claim 1.

7. The wheel according to claim 6, wherein the sound absorber unit or the sound absorber assembly is bound on a wheel rim of the wheel by a binding element.

8. The wheel according to claim 7, wherein the sound absorber unit or the sound absorber assembly itself forms a structural resonance sound absorbing component, and serving as the structural resonance sound absorbing component, the sound absorber unit or the sound absorber assembly has a first-order natural mode frequency consistent with the first-order natural mode frequency of the wheel air chamber.

9. The wheel according to claim 7, wherein the binding element is a strap, wherein the strap presses the sound absorber unit or the sound absorber assembly on the outer surface of the wheel rim from the top surface of the box body of the sound absorber unit or the sound absorber assembly and wraps around the wheel rim to fasten the sound absorber unit or the sound absorber assembly, and the tension of the strap can be adjusted and displayed with the aid of a fastening tool.

10. The wheel according to claim 9, wherein the sound absorber unit or the sound absorber assembly is provided with a U-shaped groove for the embedment of the strap on the top surface of the box body thereof.

11. The wheel according to claim 6, wherein, the sound absorber assembly is formed by directly connecting the two sound absorber units by the closed end side surfaces thereof or by connecting and combining the two sound absorber units by a plate.

12. The wheel according to claim 6, wherein a plurality of sound absorber units or sound absorber assemblies are distributed along the circumferential direction of the wheel rim.

13. The wheel according to claim 6, wherein the sound absorber unit or the sound absorber assembly abuts against the outer surface of the wheel rim with the bottom surface of the box body in a mounting state.

14. The wheel according to claim 13, wherein the sound absorber unit or the sound absorber assembly is provided with at least one bending portion extending transversely along the box body thereof, and the bending portion divides the sound absorber unit or the sound absorber assembly into at least two sections in the longitudinal direction of the box body thereof, so that the bottom surface of the box body conforms to the arc-shaped contour of the outer surface of the rim in the mounting state.

* * * * *